Feb. 24, 1931.   J. S. STOKES   1,793,876
METHOD AND MECHANISM FOR ASSEMBLING COMPOSITE WRAPPERS
Filed March 17, 1927   5 Sheets-Sheet 3

INVENTOR.
John S. Stokes
BY Cornelius D. Ehret
his ATTORNEY.

Feb. 24, 1931.   J. S. STOKES   1,793,876
METHOD AND MECHANISM FOR ASSEMBLING COMPOSITE WRAPPERS
Filed March 17, 1927   5 Sheets-Sheet 4

INVENTOR.
John S. Stokes
BY
Cornelius D. Ehret
his ATTORNEY.

Patented Feb. 24, 1931

1,793,876

UNITED STATES PATENT OFFICE

JOHN S. STOKES, OF HUNTINGDON VALLEY, PENNSYLVANIA, ASSIGNOR TO STOKES AND SMITH COMPANY, OF PHILADELPHIA, PENNSYLVANIA, A CORPORATION OF PENNSYLVANIA

METHOD AND MECHANISM FOR ASSEMBLING COMPOSITE WRAPPERS

Application filed March 17, 1927. Serial No. 175,991.

My invention relates to the method of and apparatus for assembling composite wrappers and particularly adhesive-coated composite wrappers to be applied to stayed or unstayed boxes, box-blanks, cartons, containers and the like.

My invention resides in a method of assembling composite wrappers, whose component sheets or elements are disposed in separate and individual stacks, by applying adhesive, more particularly locally in the region of eventual overlap of wrapper components to a component sheet, and moving another component sheet from position in which it does not overlie the first mentioned sheet to superimposed position, and attaching to each other by the adhesive.

My invention resides also in mechanism for assembling composite wrappers comprising means for applying adhesive, more particularly locally where the wrapper components are eventually to overlie each other, and for bringing the wrapper components into adhesive attachment to each other; and more particularly my invention resides in mechanism of the character referred to for carrying out my method as above described wherein the wrapper components are in separate and individual stacks; and more particularly my invention resides in mechanism of the character above referred to which, in addition to adhesively attaching wrapper components to each other, operates upon the composite wrapper, before the adhesive sets or while it is still fluid, to transport it to or toward conveying mechanism, and en route thereto to apply additional adhesive on its box-engaging face.

More specifically, my invention resides in apparatus of the character referred to in which mechanism, more particularly a reciprocating stencil, applies adhesive to a component sheet or wrapper element, and in which, mechanism, more particularly a suction member, which releaseably holds another component sheet, is moved in timed relation to the adhesive applying mechanism to effect the union of the wrapper elements.

Still further, my invention resides in apparatus of the character referred to, in which the adhesive applying mechanism or stencil is periodically supplied with adhesive, more particularly, by an adhesive-coated roller which contacts with the sheet-engaging surface of the stencil.

My invention resides in the method and apparatus of the character hereinafter described and claimed.

For an understanding of my invention and for an illustration of one of the forms my apparatus may take, reference is to be had to the accompanying drawing, in which.

Figures 1, 10:
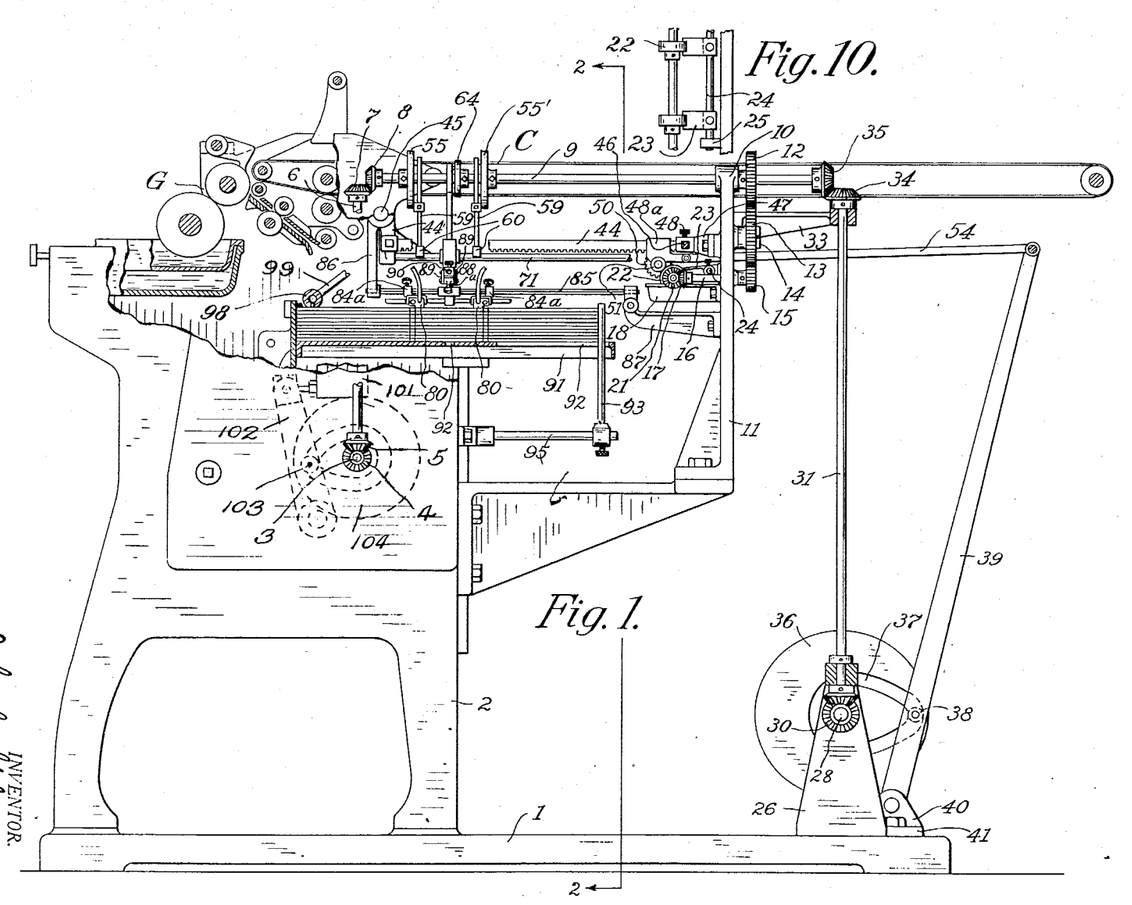
Fig. 1 is a front elevational view, partly in section, of an embodiment of my invention.
Fig. 10 is a detail, fragmentary plan view of parts shown in Fig. 1.
Figure 2:
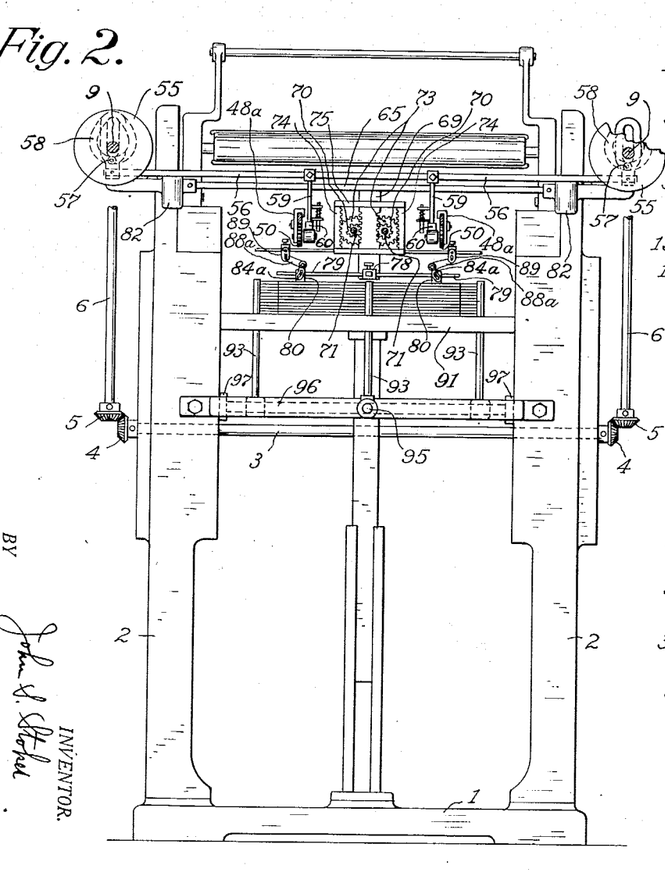
Fig. 2 is a view in side elevation taken on line 2—2 of Fig. 1, with parts omitted for sake of clarity.
Figure 3:
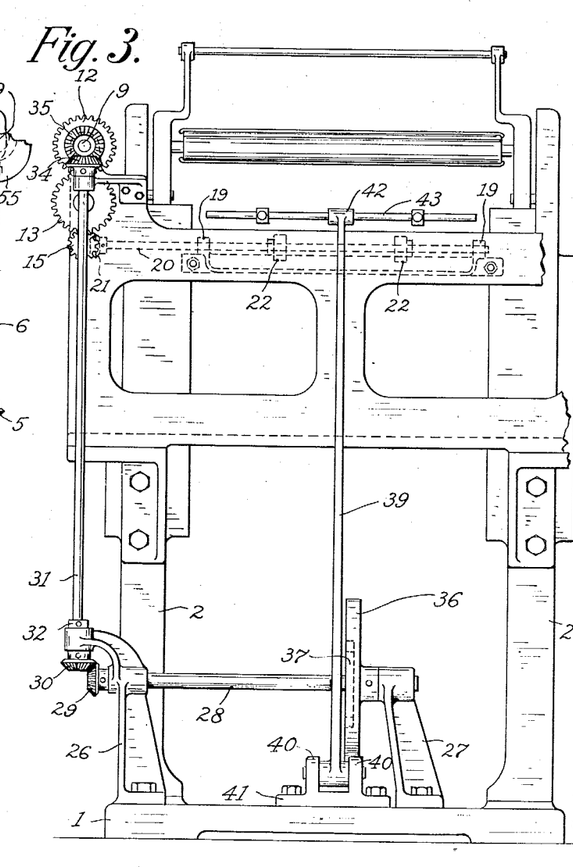
Fig. 3 is an end view in elevation of Fig. 1.

Referring to Fig. 1, on the base 1, which may be of cast iron or other suitable material, are mounted the side frames 2, through which extends the shaft 3 driven by a source of power not shown. On opposite ends of the shaft and exterior of the frame are miter or bevel gears 4, which are in mesh with gears 5 affixed to the shaft 6. To the other end of each of these shafts is attached a similar miter or bevel gear 7 which is in engagement with a gear 8 mounted on shaft 9 supported at or adjacent its opposite end by bearing 10, preferably an integral part of the supporting bracket 11. One of the shafts 9 (see Fig. 3) extends through its bearing 10 and fastened to it on the far side of the bearing is a gear 12, which drives, through the intermediate gear 13 mounted on a stud shaft 14 integral with or secured to the supporting bracket 11, a gear, 15, keyed or otherwise suitably held to the shaft 16. The supporting bracket is bossed and drilled to provide a suitable bearing for the shaft 16, which passes therethrough and is provided at its free end with a bevel gear 17.

A shallow trough or tray 18, fastened by bolts or other suitable means to the bracket 11, is provided with bearing members 19, preferably integral therewith, which receive and support the shaft 20 having at one end a gear 21 meshing with the gear 17 and on which are adjustably fastened two rollers 22 of such dimensions and so disposed that the lower portion of the respective rollers is below the normal level of a liquid adhesive contained in the trough or reservoir 18. The amount of adhesive which reaches the top surface of the rotating rolls is adjustably determined by scraper plates 23 which are capable of movement longitudinally of the rod 24, which is mounted in supports 25 secured to, or a part of, bracket 11, and also adapted to swing in an arc having the rod 24 as a center of rotation. This is most clearly shown in Figs. 1 and 4.

The members 26 and 27, bolted or otherwise fastened to the base member 1, are provided with bearings in which rotates a shaft 28 having at one end a bevel or miter gear 29, which is driven by a similar gear 30 fastened to a shaft 31. A thrust collar 32 on the shaft engages the upper surface of a bearing portion of the member 26 and relieves the gear 30 of the weight of the shaft and assembly. To the upper end of the shaft which is held in position by a member 33 fastened to the bracket 11, is secured a gear 34 in meshing relation with a similar gear 35 mounted on shaft 9.

Attached to the shaft 28, intermediate the shaft supporting members 26 and 27, is a disk 36 having a cam slot 37 in which rides the cam follower 38. A lever 39, pivoted at its lower end between the upstanding arms 40 of a member 41, bolted or otherwise secured to, or a part of, the base 1, is provided with a bearing 42 at its upper end through which a rod 43 freely passes.

Figures 4, 9, 11, 12:
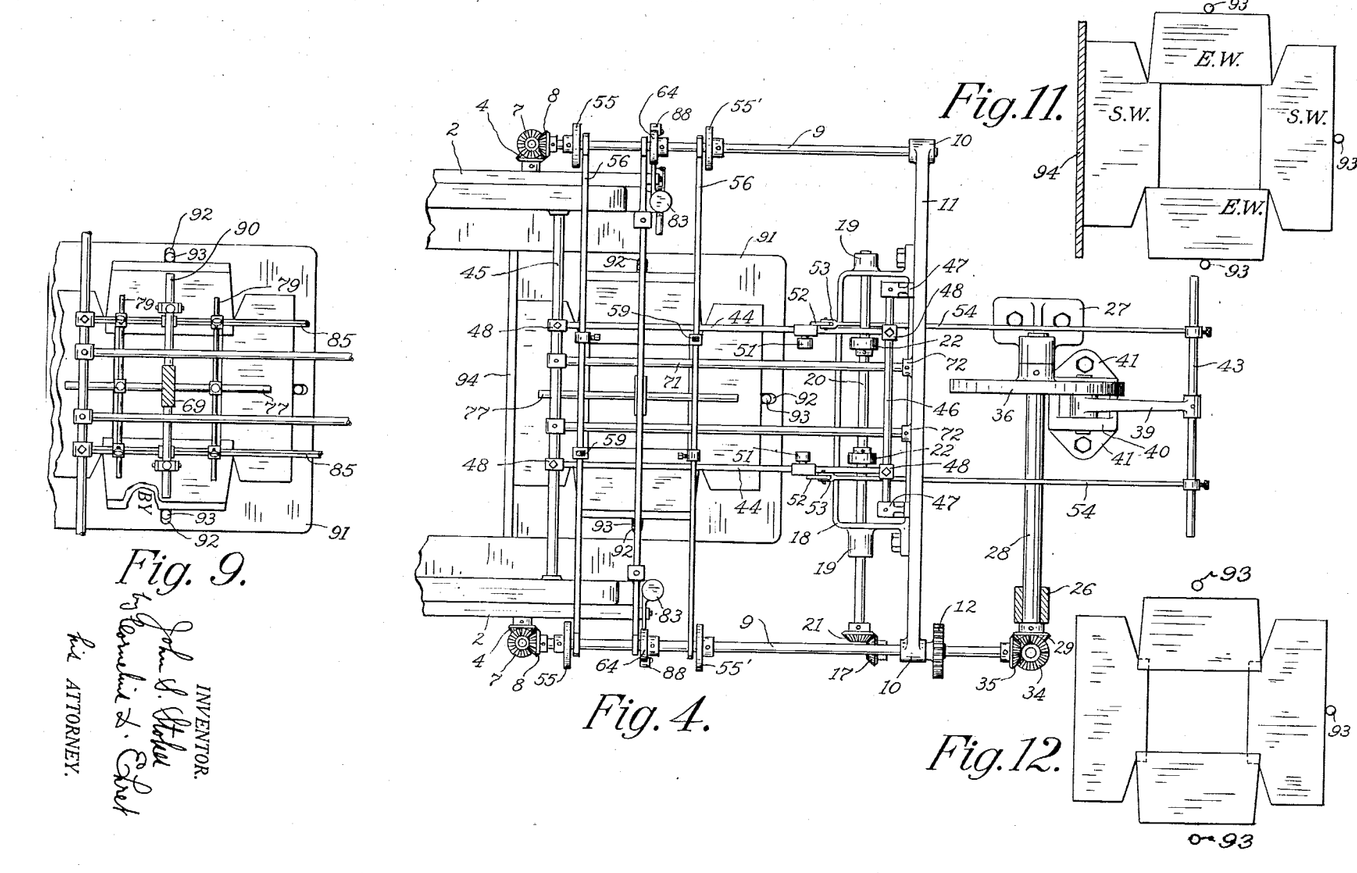
Fig. 4 is fragmentary plan view of Fig. 1.
Fig. 9 is a fragmentary view of parts disclosed in Fig. 4.
Figs. 11 and 12 illustrate, respectively, the unassembled and assembled wrapper.
Figures 5, 6, 7, 8:
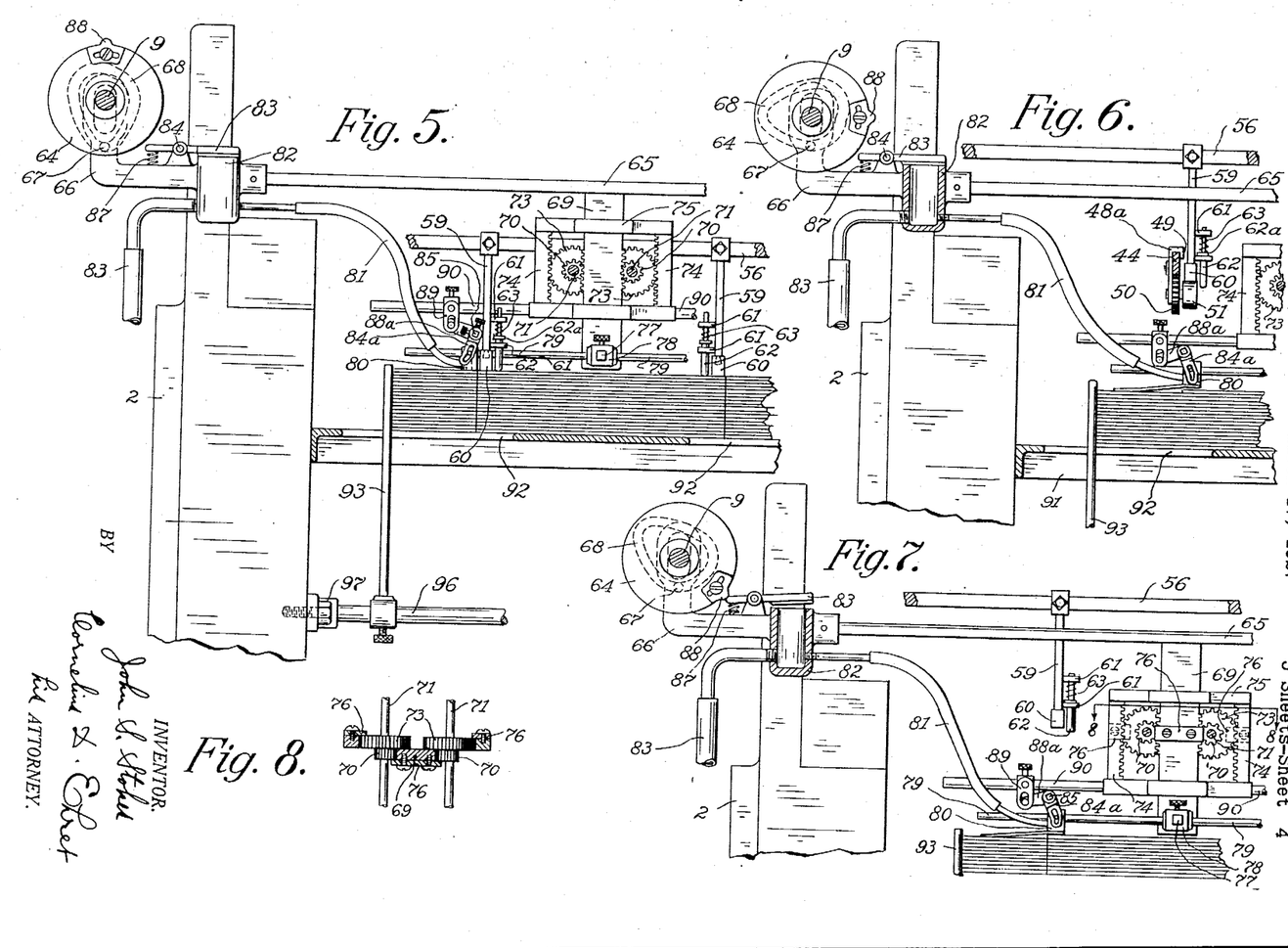
Figs. 5 to 7 inclusive are fragmentary views to illustrate the sequence of certain operations of the device.
Fig. 8 is a detail view taken on line 8—8 of Fig. 7.

Referring to Figs. 1, 4 and 6, two rack bars 44 are each supported at one end by a member 44' clamped to the stay or bracing rod 45, extending between the side frames 2 and at the other end by a rod 46 spaced from the supporting bracket 11 and held in position by the members 47 secured to, or a part of, the bracket. The rack bars may be locked in any desired position on the supporting bars 45 and 46 by any suitable means such as clamping screws 48, each extending through an eye in the end of the bar and biting into the corresponding supporting rod.

Two sliding members 48a, which each reciprocate on one of the rack bars, are provided with a hooked portion 49 to maintain them in substantial alignment with the guiding rack. A gear 50, carried by a shaft journaled in the sliding member engages the rack so that as the sliding carriage member 48a reciprocates along the rack, the gear is rotated and imparts its movement to a roller 51, which is mounted to turn therewith. The extension 52, of the carriage, is embraced by the yoke end 53 of a link arm 54 and is mechanically related thereto by a pin passing through the extension and the yoke. The other end of each of the link arms is adjustably fastened on the rod 43 so that as the lever 39 is moved under the influence of the cam disk 36, the carriages 48a travel backward and forward along the rack bars 44. At the limit of travel to the right, as viewed in Fig. 1, the rollers 51 come into contact with the rollers 22, which dip into the glue reservoir 18.

The face cam disks 55 and 55' are axially adjustable on the shafts 9 and each pair supports and imparts a purely vertical movement to a flattened bar 56, having an elongated eye at each end, through which a shaft 9 extends and serves as a guiding element for the movement of the bar. A cam roller or follower 57, fixed to the lower portion of each of the eye members, rides in a cam slot 58 in the face of the related disk. Depending from each of the bars 56 is a pair of rods 59, each of which has a tip or stencil 60 of rubber or other suitable material at its lower end. The individual stencil rods 59 are movable along the bar 56 and may be clamped in the desired position by any suitable means, for example, a set-screw.

Referring to Fig. 6, the motions of the glue transporting rollers 51 and the rubber stencils are so correlated that as the carriage 48a, carrying the roller 51 is in the vicinity of the stencils, the latter are in such a position that some of the adhesive on the periphery of the roller is transferred to stencil member.

At this point it should be noted that for all adjustments of the rack bars 44 and the stencil rods 59, the latter are always within the space defined by the former. On the side of each stencil rod 59, which is remote from the associated rack, is a pair of upstanding lugs 61, through which passes an extension of a downwardly biased plunger or stripper member 62. The plunger is provided with a shoulder 62a engaging the upper surface of the lower lug 61 to limit the extent of its travel under the influence of the biasing spring 63 positioned between the lower surface of the upper lug 61 and the shoulder 62a.

A cam 64 is mounted on each of the shafts 9 between cam disks 55 and 55' and may be adjustably positioned thereon. The cams 64 support and impart a vertically reciprocating movement to a composite member comprising a central bar portion 65, the opposite ends of which are received by member 66 having as an extension, an elongated eye portion through which the shaft 9 passes to serve as a guiding member. A cam roller 67 is affixed to each of the members 66 and travels in the cam slot 68 of the corresponding cam plate 64.

Disposed centrally of the cross bar 65 is a downwardly extending rack bar 69, having teeth on two opposite faces to form, in effect, two racks, each of which is in engagement with a gear 70, freely movable on a stationary shaft 71 supported at one end by the bracing bar 45 and at the other end by a recessed abutment 72 on, or a part of, the supporting bracket 11.

The gears 73, see Fig. 8, are integral with the gears 70, or at least clamped to them so that each pair of gears, 70, 73 rotates as a unit. The rack members 74, which constitute the side members of a frame 75, which is guided for vertical movement by the rack bar 69, are each engaged by a gear 73, the net result being that as the rack bar 69 is moving downwardly, the frame 75 is moving upwardly, and vice versa, and at different relative speeds since the gears 70 and 73 are not of the same diameter. The rack members 69 and 75 are provided with guide plates 76 of sufficient width to constantly engage opposite sides of the double gear units and prevent them from getting out of operative relation to the racks either during operation of the machine or during adjustment.

Extending through and fastened to the lower end of rack member 69, is a square rod or bar 77, having adjustably mounted thereon, on each side of the rack, a member 78, which carries the guide rods 79. A suction element 80, having an opening in its lower face, is freely slidable on each of these guide rods and is connected by means of the flexible hose 81 to a pipe threaded into a relief chamber 82 carried by, or a part of, the reciprocating member 66. The relief chamber is normally closed to the atmosphere by a valve 83 pivotally mounted, as at 84, to the member 66, and biased by a spring 87. An adjustable tripping member 88, during a certain phase of the operation of the device, engages an extended arm of the valve 83 and opens it, so that the suction of the member 80 is destroyed. The chamber 82 is connected as by a flexible hose 83 to a source of suction not shown.

The suction members 80 are operated by a lever 84a having a slot in which a pin projecting from the suction element is free to move to provide a lost motion connection between the member 84 and mechanism hereinafter described. As is most clearly shown in Fig. 1, a pair of levers 84a is mounted on a square rod 85, whose ends, however, are circular in cross-section so that the rod with its assembly is free to rotate in its supporting bearings, one of which is formed in the lower end of a member 86 supported by and adjustably positioned on the bracing rod 45, and the other of which is similarly supported by a rod supported by brackets 87 fastened to member 11.

The shaft 85 is rocked by means of a lever 88a, adjustably clamped to the shaft and having a pin which engages the side walls of a slot in an adustable member 89 fastened to a rod 90, extending from the double rack frame 75. As the shaft 85 is square and the holes in the levers 84 and 88 are also square, the angular relation between the levers is constant and substantially 90°.

A bed plate 91 is provided with slots 92 through which the three positioning rods 93 extend. The rod 93, which is oppositely disposed with respect to the fixed back plate 94, is adjustably mounted on a rod 95, fastened to a cross member between the side frames 2. The other two positioning rods are similarly mounted on a rod 96, which is received in recessed members 97, bolted to the side frames 2.

Operation

After the stacks of paper, which are to be assembled to form a composite wrapper for a box or other object, have been placed on the bed plate 91, substantially as shown in Fig. 11, the positioning rods 93 are adjusted to maintain them in that relation. Each pair of stencil rods 59 is adjusted along its respective operating rod so that the rubber tips 60, when depressed, register with the four innermost corners of the side wrap stacks. The racks 44 and the links 54 are next adjusted so that the path of travel of the two carriages 48a brings the rollers 51 in proper registering position with the stencils. The glue rolls 22 and the scrapers 23 are shifted along their respective shafts into register with the path of movement of rolls 51. The two rods 79, the two rods 85, and the four members 89 are adjusted so that at one extreme of movement, the suction members 80 are disposed immediately over the four inner corners of the end wrap stacks and at the other extreme of movement are disposed at the four inner corners of the side wrap stacks.

It will be understood that in tracing the consecutive operations necessary to produce a single sheet, the fact is ignored that as regards the assembly of several sheets, the steps are concurrent. Starting with the parts as indicated in Fig. 1, the cam 36, driven through a train of shafts and gears from shaft 3, is at one extreme of its travel. The lever 39 and links 54 are disposed so that the rolls 51 of the carriages 48a receive a coating of glue from the glue rollers 22, driven from the same source as the cam disk 36. As the cam 36 continues to move, the carriages 48a guided by the racks 44 travel to the left as viewed in Fig. 1, the rollers 51 constantly rotating, due to the engagement between the teeth of the racks 44 and the gears 50, and depositing a uniform coating of adhesive to the rubber tips 60 of the stencils as they pass under them. The rollers 51 are then returned by the same agency to their original position for another coating of adhesive.

After the carriages 48a have passed the stencils 60, on their return stroke, the cams 55 and 55', acting simultaneously, cause the stencils to move downwardly, as described, and impart a dab of glue to the two inner corners of each of the side wraps. Any tendency of the sheets to stick to the stencils on their upward movement is prevented by the strippers 62 which remain in engagement with an unglued portion of the sheet until the stencil 60 itself has travelled a substantial distance upwardly.

The adhesive utilized in accordance with my invention may be of any suitable character, and may be applied in any state suitable to its nature. Ordinarily the adhesive, as glue, is applied in plastic, fluid or liquid form or state suitable for effecting its transfer from the stencils to the wrapper components. My method also includes the application of water or other solvent to the coating of glue or other adhesive previously applied to and dried upon the wrapper elements, the application of the solvent rendering the material adhesive prior to the application of the other element or elements and before the adhesive again dries or sets. My method comprehends also the utilization of dry or powdered adhesive material to the wrapper elements, with application of heat or other agent, with or without the application of pressure, to effect plasticity, adhesion and pliability at the required times.

For example, if a prepared paper having a coating of a dried adhesive is used, the reservoir 20 may contain water or other solvent. The stencils 60, moistened by the rollers 51, contact with the prepared inner corner of the side wraps. The succeeding steps of the assembly are not changed. It is likewise within the scope of my invention to apply the adhesive to the side wraps or to all of the engaging surfaces.

While the glue is being applied to the corners of the side wraps by the stencils 60, the members 80 are holding the top sheets of each of the end wrap stacks by suction. The cams 68 are then disposed so that the transverse bar 65 is at the lowest point in its travel. As the cams continue to travel, the bar 65 is raised, moving with it the bars 79 to which the suction members 80 are attached. The top sheets of the end wrap stacks are thereby separated from the stack and at the same time, as the bars 79 and 90 approach each other, due to the mechanical arrangement of the racks 69 and 74, and the associated mechanism, are transported toward the center of the stack assembly. When they are so positioned that the corners of the side and end wraps are substantially as shown in Fig. 12, the corners of the end wraps are quite forcibly pressed on the corners of the side wraps by the lost-motion mechanism, including levers 84, 88a, the member 89, and the suction block 80.

As the bar 65 moves downwardly the member 89 is moving upwardly with the pin connected to the free end of arm 88a engaged by the bottom of the slot in member 89. After a certain extent of movement a pin on the member 80 is engaged by the top edge of the slot in member 84 movable with arm 88a to effect a positive downward movement of the member 80 upon continued upward movement of member 89 connected to bar 90 to forcibly press the corners of the end wraps on the corners of the side wrap elements. At or about this point, the trip member 88 carried by the cam 64 engages the extension of valve 83 and destroys the holding action of the suction member.

The composite wrapper now completely assembled is immediately fed by mechanism operating in timed relation to the wrapper-assembling apparatus and of the type employing a suction roller 98, disclosed in Nitsch and Baker Patent No. 1,684,741, to the gluing unit G, which applies a coating of adhesive to one side of the assembled wrapper and then deposits it on a conveyor belt C, which is preferably directly associated with a box wrapping machine.

Figure 13:
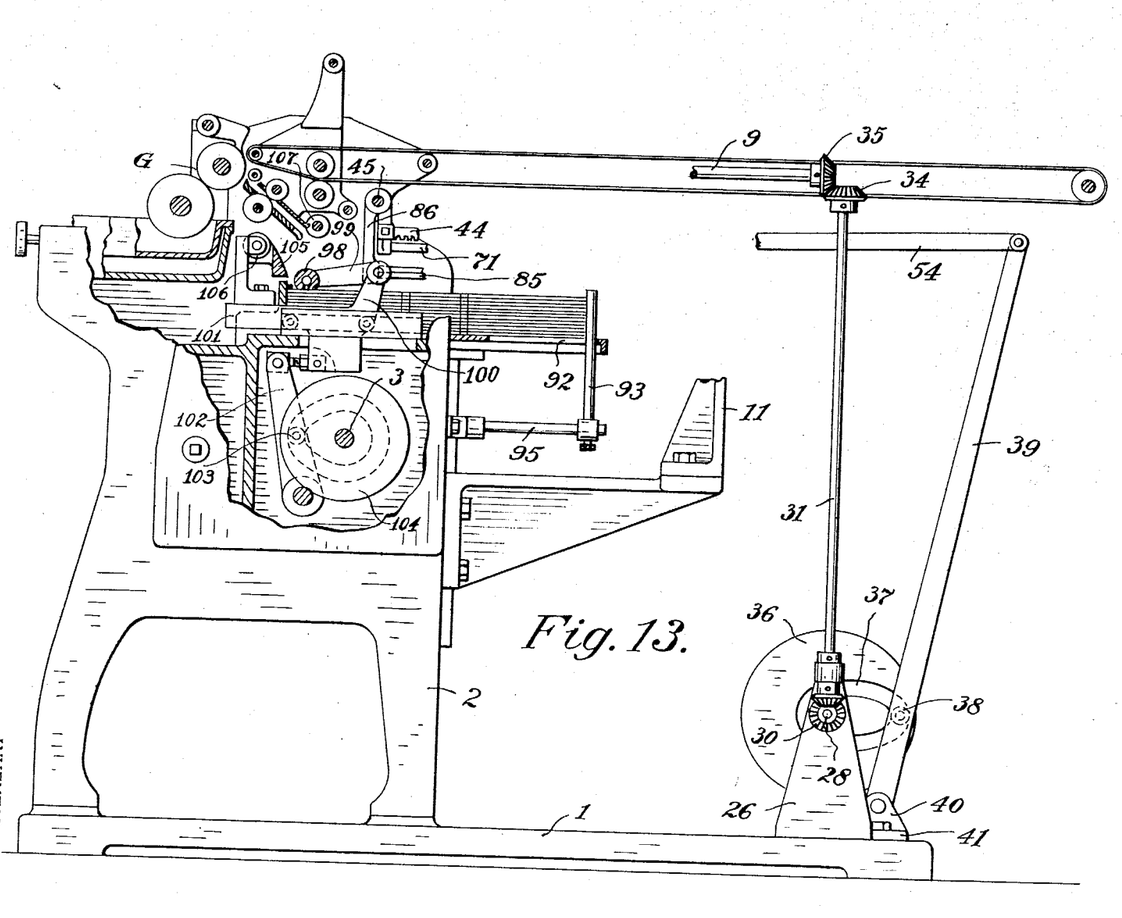
Fig. 13 is a front elevational view, partly in section, and with parts omitted, to disclose wrapper removing mechanism.

Briefly, the suction roller 98 is mounted upon an arm 99 pivoted to bracket 100 extending upwardly from a carriage 101 reciprocated by an arm 102 to which is attached a cam follower 103 co-operating with cam 104 suitably secured to and rotatable with shaft 3. As the carriage 101 moves to the right, Fig. 13, arm 99 is caused to rotate in a clockwise direction to limited extent, by mechanism disclosed in the aforesaid Nitsch and Baker patent, lifting the forward edge of the assembled wrapper. During continued movement, the under side of the wrapper is engaged by the guide member or tongue 105 and thereafter clamped between the feed rolls 106, 107 which deliver it to the adhesive-applying mechanism.

To prevent the front edge of the back side wrap of the assembled wrapper from catching the back edge of the front side wrapper stack, it is necessary for satisfactory operation to use a flexible guide strip as disclosed in United States Letters Patent No. 1,644,549 to Streeper, dated October 4, 1927.

As the assembled sheets are fed to the gluing machine G, the top of the stacks is maintained in the proper position with respect to the assembling mechanism by moving the table or bed plate 91 upwardly by such means as disclosed in the aforesaid Nitsch & Baker patent.

The method of assembling a composite wrapper herein described is broadly similar to that of my Patent No. 1,625,577, dated April 19, 1927. The mechanism herein disclosed is capable of automatically performing the steps of the broad method of the copending application referred to, and also the modified method of this application.

The flimsy nature of the assembled composite wrap is such as to prevent a quantity of wraps of this type from being stacked and subsequently placed as single cut-out sheet wrappers in a gluing machine. By directly assembling the composite sheet on the bed plate of the gluing unit or machine, and immediately upon completion in the assembled form, feeding it to the gluing unit, such a type wrapper is made commercially practical.

For brevity in the appended claims the term "box" is employed in a generic sense to include open and closed cartons, containers and boxes, and unstayed boxes or box blanks; and the term "fluid" as applied to the adhesive or adhesive coatings is employed generically to include the condition of the adhesive, whatever its character, before it sets, hardens, or dries.

What I desire to claim as my invention and to protect by Letters Patent is:

1. Mechanism for assembling wrappers from component elements comprising reciprocating means for applying adhesive to certain of said elements, means for stripping the treated elements from said reciprocating means, and means operating in timed relation to said reciprocating means to move other of said elements into engagement with said first-named elements.

2. Mechanism for assembling wrappers from component elements comprising means to apply an adhesive to certain of said elements, suction means to releasably hold other of said elements, and means operated in timed relation to said first means imparting movement to said suction means to effect the union of said elements.

3. Mechanism for assembling wrappers from component elements comprising means to apply an adhesive to certain of said elements, suction means to releasably hold other of said elements, means operated in timed relation to said first means imparting movement to said suction means to effect the union of said elements, and means to thereafter render said suction means ineffective.

4. Mechanism for assembling wrappers from component elements comprising means to apply an adhesive to certain of said elements, means to releasably hold other of said elements, and means to impart movement to said holding means and to effect the union of said elements under pressure.

5. Mechanism for assembling wrappers from component elements comprising means to apply an adhesive to certain of said elements, means to releasably hold other of said elements, means to impart movement to said holding means and to effect the union of said elements under pressure, and means to release said holding means.

6. Mechanism for assembling wrappers from component elements comprising means for establishing a space relation of said elements in wrapper simulating position, means to effect an adhesive condition of a component element while in said position, and means operating in timed relation to said second means to alter the space relation of said elements whereby their union in wrapper forming position is produced.

7. Mechanism for assembling wrappers from component elements comprising reciprocating means to apply adhesive to component elements, means for stripping the treated elements from said reciprocating means, and means operating in timed relation to said reciprocating means to move another of said elements into engagement with said first named elements.

8. Mechanism for assembling wrappers from contiguous stacks of component elements comprising means for applying a dab of adhesive to a restricted zone of an end element of a stack, and means operating in timed relation to said first means to move an end element of another stack into contact with said zone.

9. Mechanism for assembling wrappers from component elements comprising a reciprocating stencil for applying a dab of adhesive to a restricted area of a component element, and means operating in timed relation to said first means to move another element into contact with said area.

10. Mechanism for assembling wrappers from component elements comprising means for applying a dab of adhesive to a restricted area of a component element, means to hold another component element, means to impart movement to said second means to bring said area in contact with said transported element, and means including said holding means for exerting pressure on said elements at the area of contact.

11. Apparatus for assembling wrappers from stacks of component elements comprising means to effect an adhesive condition of top sheets of certain of said stacks, mechanism operating in timed relation to said means for transporting top sheets of other of said stacks into engagement with said first named sheets to form a wrapper, and means operating in timed relation to said mechanism to remove said assembled wrapper.

12. Apparatus for assembling wrappers from stacks of component elements comprising means to maintain said stacks in proper relative position, means to effect an adhesive condition of top sheets of certain of said stacks, mechanism operating in timed relation to said means for transporting top sheets of other of said stacks into engagement with said first named sheets to form a composite wrapper, and means operating in timed relation to said mechanism to remove said assembled wrapper.

13. In mechanism for assembling wrappers from component elements, reciprocating means to apply adhesive to certain of said elements, and means attached to, and movable with, said reciprocating means to strip said viscous elements therefrom.

14. The combination with means for applying an adhesive to wrappers in succession, of means for assembling said wrappers from component parts and means operating in timed relation to said second means to feed each wrapper as assembled to said first named means.

15. In mechanism for assembling wrappers from component sheets, means energized to hold certain of said sheets, means to impart movement to said sheet-holding means, and means operating in timed relation to said second means to deenergize said first means when the sheets held thereby are superposed on other of said sheets.

16. In mechanism for assembling wrappers from component sheets, means to hold certain of said sheets, means to move said holding means in a vertical direction, and means moving in a reverse direction to said second means to impart a horizontal movement to said holding means.

17. In mechanism for assembling wrappers from component sheets, suction means energized to hold certain of said sheets, means to move said holding means in a vertical direction, means to move said holding means in a horizontal direction, and means to de-energize said suction means when the sheets held thereby are superposed on other of said sheets.

18. In mechanism for assembling wrappers from component sheets, means to hold certain of said sheets, means to move said sheet-holding means in a vertical direction, means operated by said second means to move said sheets in a horizonal direction, a lost-motion connection between said second and third means to press sheets held by said first means on other of said sheets.

19. In mechanism for assembling wrappers from component sheets, means energized to hold certain of said sheets, means to move said sheet-holding means in a vertical direction, means operated by said second means to move said sheets in a horizontal direction, a lost-motion connection between said second and third means to press sheets held by said first means on other of said sheets, and means to de-energize said holding means.

20. The method of assembling a composite wrapper from separate and individual stacks of component sheets which comprises applying adhesive to a sheet of a stack, and moving in substantially flat condition, a sheet from another stack into contact with the first named sheet.

21. The continuous method of assembling composite wrappers in succession from separate and individual stacks of component sheets which comprises in succession applying adhesive to a sheet of a stack, moving, in substantially flat condition, a sheet from another stack into contact with the first sheet, and removing the assembled wrapper.

22. The method of assembling a composite wrapper from separate and individual stacks of component sheets which consists of applying adhesive to a sheet of a stack, moving a sheet from another stack to a position in which it overlies the first named sheet, and bringing the sheets into a relation in which they are held to each other by the adhesive.

23. The method of assembling a composite wrapper from separate and individual stacks of component sheets which consists of applying adhesive, in the region of overlap of wrapper components, to an end sheet of a stack, moving a sheet from another stack to a position in which it overlies the first named sheet, and bringing the sheets into a relation in which they are held to each other by adhesive.

24. The method of assembling a composite wrapper from separate and individual stacks of component sheets which comprises applying adhesive in the region of overlap of wrapper components, to an end sheet of a stack, and moving a sheet from another stack, in substantially flat condition, into contact with the first named sheet.

25. The continuous method of assembling composite wrappers in succession from separate and individual stacks of component sheets which comprises in succession applying adhesive in the region of overlap of wrapper components to an end sheet of a stack, moving, in undeformed condition, a sheet from another stack into contact with the first sheet, and removing the assembled wrapper.

26. Apparatus for assembling wrappers from stacks of component elements comprising means to effect an adhesive condition of end sheets of certain of said stacks, means operating in timed relation to said means to transport end sheets of other of said stacks into engagement with said first named sheets to form a wrapper, and means to remove said wrappers individually as assembled.

27. The combination with mechanism for applying adhesive to wrappers, of means for assembling a wrapper from component parts, and means to feed the assembled wrapper to said first means.

28. The combination with mechanism for applying adhesive to wrappers in succession, of means for assembling wrappers from stacks of component parts, and means to feed said wrappers individually as assembled to said adhesive applying mechanism.

29. The combination with mechanism for applying adhesive to wrappers in succession, of means for assembling wrappers from stacks of component parts comprising means applying adhesive to regions of overlap of end elements of certain of said stacks, and means to move end elements of other stacks into engagement therewith, and means to feed the assembled wrapper while the adhesive between said elements is fluid to said adhesive-applying mechanism.

30. The continuous method of assembling composite wrappers from stacks of component elements which comprises arranging the stacks in wrapper simulating position, effecting an adhesive condition of an end element of a stack, and effecting engagement therewith of an end element of another stack by movement of one only of said end elements.

31. The continuous method of assembling composite wrappers from stacks of component elements which comprises arranging the stacks in wrapper simulating position, effecting an adhesive condition of end elements of certain of said stacks, and moving certain of said end elements to effect union of all of said end elements in wrapper forming position.

32. The continuous method of assembling composite wrappers from stacks of component elements which comprises arranging the stacks in wrapper simulating position, effecting an adhesive condition of end elements of certain of said stacks, and moving end elements of other of said stacks towards each other and into engagement with said first end elements in wrapper forming position.

33. Mechanism for assembling wrappers from stacks of component elements, comprising means to apply adhesive to end elements of certain of said stacks, and means operating in timed relation to said first means to move end elements of other of said stacks into engagement with said adhesive-treated elements.

JOHN S. STOKES.